United States Patent
Cui et al.

(10) Patent No.: US 11,644,314 B2
(45) Date of Patent: May 9, 2023

(54) SYNTHETIC MEGA GYROSCOPE

(71) Applicant: PhasorLab, Inc., Billerica, MA (US)

(72) Inventors: Jian Cui, Waltham, MA (US); Joshua C. Park, Billerica, MA (US)

(73) Assignee: PhasorLab, Inc., Billerica, MA (US)

( * ) Notice: Subject to any disclaimer, the term of this patent is extended or adjusted under 35 U.S.C. 154(b) by 30 days.

(21) Appl. No.: 16/835,298

(22) Filed: Mar. 30, 2020

(65) Prior Publication Data

US 2020/0309531 A1 Oct. 1, 2020

Related U.S. Application Data

(60) Provisional application No. 62/825,402, filed on Mar. 28, 2019.

(51) Int. Cl.
| | | |
|---|---|---|
| *G01C 21/18* | (2006.01) | |
| *G01P 15/14* | (2013.01) | |
| *G01C 19/34* | (2006.01) | |

(52) U.S. Cl.
CPC .............. *G01C 21/18* (2013.01); *G01C 19/34* (2013.01); *G01P 15/14* (2013.01)

(58) Field of Classification Search
CPC ........ G01C 21/18; G01C 19/34; G01C 21/16; G01C 21/165; G01P 15/14; G01S 5/0221;
(Continued)

(56) References Cited

U.S. PATENT DOCUMENTS 9,538,537 B1 1/2017 Cui et al.
10,349,367 B2 * 7/2019 Aldana ................. H04W 24/10
(Continued)

OTHER PUBLICATIONS

Bancroft et al.: "Data Fusion Algorithms for Multiple Inertial Measurement Units", www.mdpi.com.journal/sensors, ISSN 1424-8220, Sensors 2011, 11, 6771-6798; doi:10 3390/s110706771.
(Continued)

*Primary Examiner* — Tung S Lau
(74) *Attorney, Agent, or Firm* — Michael Y. Saji

(57) ABSTRACT

Systems and methods are disclosed herein for blind frequency synchronization. In one embodiment, a synthetic inertial measurement unit (IMU) is disclosed, comprising: a plurality of nodes wirelessly coupled to each other, each The method may further comprise: a wireless transceiver at a particular node for providing wireless communications with at least one other node of the plurality of nodes, configured to receive I and Q radio samples from the other node, and to determine a frequency offset of the other node based on the received I and Q radio samples, and to synchronize a clock at the particular node, a frequency offset synchronization module at the particular node coupled to the wireless transceiver, at the particular node, and an IMU sensor for determining rotation, acceleration, and speed of the particular node; and an IMU location estimation module for using time of arrival information assuming that the clock may be synchronized at the node, the determined distance, and the rotation, acceleration, and speed of the particular node received from the IMU sensor to determine the location of the nodes, thereby providing enhanced determination of location of the plurality of nodes.

14 Claims, 12 Drawing Sheets

(58) Field of Classification Search
CPC ........ G01S 5/0289; G01S 5/0226; G01S 5/14; G01S 19/49; H04W 4/40; H04W 4/027; H04L 27/2657
See application file for complete search history.

(56) References Cited

U.S. PATENT DOCUMENTS

| | | | | |
|---|---|---|---|---|
| 10,911,211 | B1* | 2/2021 | Kratz | H04J 3/0667 |
| 2012/0063447 | A1* | 3/2012 | Tyrrell | H04W 56/00 370/350 |
| 2014/0122958 | A1* | 5/2014 | Greenebrg | A61B 5/6831 714/748 |
| 2015/0110231 | A1* | 4/2015 | Alexander | H04L 27/2675 375/362 |
| 2017/0042425 | A1* | 2/2017 | Ramlall | A61B 5/0024 |
| 2019/0110264 | A1* | 4/2019 | Chung | H04W 56/002 |
| 2019/0111264 | A1* | 4/2019 | Zhou | A61N 1/36585 |
| 2020/0119825 | A1* | 4/2020 | Lin | H04W 72/0446 |
| 2021/0132182 | A1* | 5/2021 | Srinivas | G01S 5/0226 |

OTHER PUBLICATIONS

Koh et al.,: "Using Inertial Sensors for Position and Orientation Estimation", Delft Center for Systems and Control, Delft University of Technology, the Netherlands, Jun. 10, 2018.
Bancroft.: "Multiple Inertial Measurement Unit Integration for Pedestrian Navigation", http://www.geomatics.ucalgary.ca/graduatetheses), Dec. 2010.
Sturza,: "Skewed axis inertial sensor geometry for optimal performance", https://www.researchgate.net/publication/253786491, Oct. 1988.
Solomina, I., et al. "Redundant IMUs for precise trajectory determination." Proceedings of the 20th ISPRS Congress, Istanbul, Turkey. vol. 1223. 2004. APA.
Wikipedia, "Inertial measurement unit", https://en.wikipedia.org/wiki/Inertial_measurement_unit, Mar. 27, 2020.

* cited by examiner

SYNTHETIC MEGA GYROSCOPE

CROSS-REFERENCE TO RELATED APPLICATIONS

This application claims the benefit of priority under 35 U.S.C. § 119(e) of U.S. Provisional Patent Application No. 62/825,402, filed Mar. 28, 2019, and entitled "Synthetic Mega Gyroscope," which is hereby incorporated by reference in its entirety for all purposes. Additionally, U.S. Pat. Nos. 9,048,979 and 9,048,980 are each hereby incorporated by reference in their entirety for all purposes.

BACKGROUND

As competitive consumer markets drive the price of mobile navigation devices lower, an increasingly common choice for IMUs (inertial measurement units) is micro electro-mechanical systems (MEMS). Their small size, low cost, light weight and low power consumption make them an attractive grade of IMU.

The single raw IMU measurements are normally mapped onto a common frame (i.e., a virtual frame) and typically processed using a filter such as the extended Kalman filter (EKF). However, a single IMU's in-run biases, scale factors and high noise require an effective integration scheme to mitigate these errors [1].

The technologies that combine the multiple IMUs together to improve the estimation accuracy of body rotation and location have been receiving more attention [2]. For example, a large stacked Kalman filter is constructed of several IMUs. This filter construction allows for relative information between the IMUs to be used as updates. The virtual IMU (VIMU) architecture is the most commonly used architecture in the literature.

In the latest state-of-art multiple IMU technology, a federated filter is used to process each IMU as a local filter. The output of each local filter is shared with a master filter, which in turn, shares information back with the local filters.

SUMMARY

A synthetic inertial measurement unit (IMU) is disclosed, comprising: a plurality of nodes wirelessly coupled to each other, each The method may further comprise: a wireless transceiver at a particular node for providing wireless communications with at least one other node of the plurality of nodes, configured to receive I and Q radio samples from the other node, and to determine a frequency offset of the other node based on the received I and Q radio samples, and to synchronize a clock at the particular node, a frequency offset synchronization module at the particular node coupled to the wireless transceiver, at the particular node, and an IMU sensor for determining rotation, acceleration, and speed of the particular node; and an IMU location estimation module for using time of arrival information assuming that the clock may be synchronized at the node, the determined distance, and the rotation, acceleration, and speed of the particular node received from the IMU sensor to determine the location of the nodes, thereby providing enhanced determination of location of the plurality of nodes.

The IMU location estimation module may be for receiving IMU sensor data from the other node and using the received IMU sensor data, the determined distance to the other node, and the location of the particular node to determine an inertial measurement of the other node. The synthetic IMU may be configured to determine an inertial measurement of each of the plurality of nodes and determine a synthetic inertial measurement for a single rigid body coupled to the plurality of the plurality of nodes. Each of the plurality of nodes may be located on one of a plurality of aerial vehicles, and The method may further comprise tracking a location of each of the plurality of aerial vehicles using the determined location of the particular node and a determined location of each of the plurality of nodes. The frequency offset synchronization module may be configured to determine the frequency offset based on one or more of: an angle of arrival of the received I and Q radio samples; and a cross-correlation between the received I and Q radio samples. The plurality of nodes may be physically coupled to a plurality of: autonomous vehicles; drones; mobile vehicles; space vehicles, including satellites and landers; aircraft, including airborne drones and unmanned aerial vehicles (UAVs); mobile drone, including consumer robots and appliances; or autonomous balancing vehicles.

The IMU sensor may be configured to provide six-axis, nine-axis, acceleration, roll, yaw, pitch, or other orientation information. The IMU sensor uses at least one of a gyroscope, an accelerometer, and a magnetometer. The synthetic IMU may be coupled to a Global Positioning System (GPS) positioning system for providing enhanced positioning accuracy. The synthetic IMU may be configured to provide enhanced indoor positioning accuracy for one or more of the plurality of nodes. The IMU location estimation module uses a stacked filter to combine IMU information from the particular node and from the other node. The IMU location estimation module may be located at a gateway. The plurality of nodes uses properties of orthogonal frequency division multiplexing (OFDM) signaling to synchronize the nodes. The plurality of nodes uses cross-correlation of orthogonal frequency division multiplexing (OFDM) signaling to synchronize the nodes.

DETAILED DESCRIPTION

A new multi-IMU (NMIMU) approach is described that allows for the inclusion of relative geometry constraints, such as relative position, velocity and attitude between IMUs. The use of these constraints represents an advantage over the conventional technology called virtual IMU (VIMU) [3], since VIMU architectures fail to utilize this valuable information. The centralized filter consists of several individual local filters, and are contained within one centralized filter, ultimately operating as one. The significant improvement in location accuracy is achieved with the increase of number of IMUs with different configuration of IMUs on rigid bodies.

The Challenges

The accuracy of each stacked filter architecture as a function of the number of IMUs is presented in [3]. Results indicate that the stacked filter provides a linear increase in accuracy, while other architectures typically have less improvement with the addition of more than three IMUs. For any architectures of combining multiple IMUs, the gain of location estimation accuracy with multiple IMUs is quickly disappeared due to the timing error as shown in [3].

Because of this issue, the incremental improvement for the NMIMU or VIMU fusion methods was modest. In this case the NMIMU with (Adaptive Kalman Filter) AKF provided the best solution, despite marginal time synchronization issues.

Another shortcoming of existing technologies is the geometry of multiple IMUs which are limited to configurations called class I and II presented in [4]. The commonly considered sensor geometries are based on regular polyhedra. A polyhedron is regular if its faces are congruent regular polygons and the polyhedral angles are all congruent. There are only five regular polyhedra, as is well known.

IMU Sensor geometries where the sensor axes are placed along the normals to the faces of these polyhedra are spherically symmetric. It is possible to extend to other known configuration such as the satellite and warship or another shape of rigid body with distributed IMUs. As it is shown that the current technology can only get benefit with a few IMUs due to the time error among IMUs. In theory, the distributed IMUs can be combined to achieve better performance than single IMU. However, if the use of redundant IMUs proves to be of practical interest, a straightforward way to go is to use more independent, standard IMUs. But this is easier said than done. Time synchronization becomes critical, the relative orientation (position and attitude) of the IMUs must be measured and/or calibrated precisely, where the IMUs are positioned on the object matters. And these geometric constraints have to be transferred to either the system dynamic observation model—the equations of motion—or to the static observation model—the measurement equations [5].

The Possible Solutions

Figure 10A:
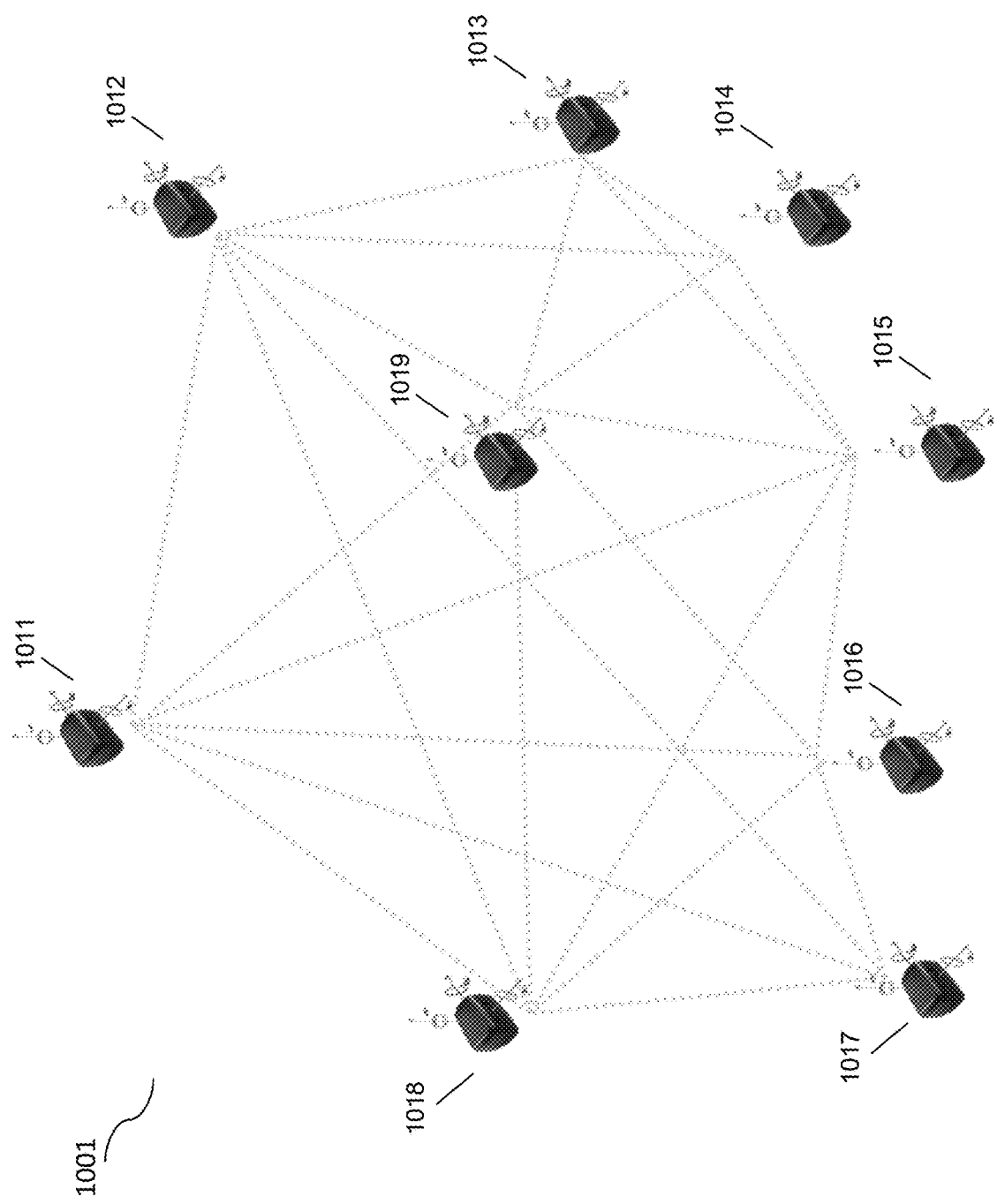
FIG. 10A is a schematic diagram showing a wireless IMU network, in accordance with some embodiments.

Our HSN network [6] provides the technologies which can accurately synchronize the distributed IMUs on wireless network as shown in FIG. 10A. Since we can dynamically estimate the relative position among IMUs, this is equivalent to having the multiple IMUs attached to the rigid body. The output of multiple IMUs equal to have one Gyroscope with high precision, high cost and large size.

With our technology, the big challenge faced by existing SF or VIMU technologies due to the timing error among IMUs can be removed. Our technology provides the unique solution of combining multiple IMUs together to achieve high accuracy rotation and location estimation technology which is far beyond the current technologies. Another advantage is that larger rigid bodies and many more IMUs can be incorporated in the wireless system, which is not feasible for existing technologies.

What we want to do are to extend the current multiple IMUs for various rotation and location applications with the following features.

Based on the technique disclosed in U.S. Pat. No. 9,538,537, hereby incorporated by reference, the relative location of IMUs which are served as each node in wireless mesh network, can be calculated instantaneously.

We provide a mathematical model for any arbitrary 3-D configuration of IMUs, i.e., mathematical models for the accuracy and performance of other shapes beyond the well-known shapes.

We provide wireless precise synchronization of all distributed IMUs.

With above feature, we enable a target object that could be any object with larger sizes, e.g., beyond meters.

Figure 10B:
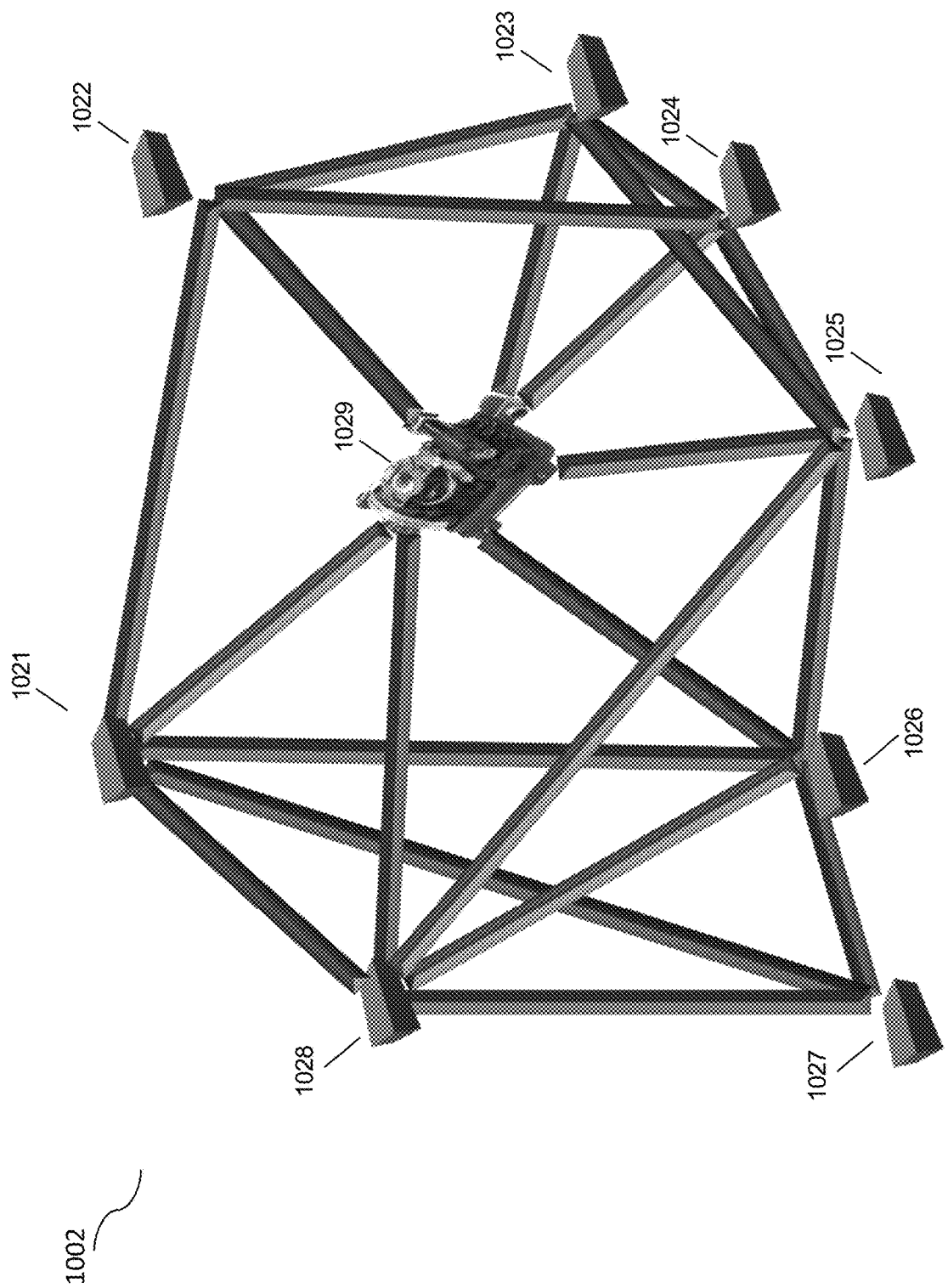
FIG. 10B is a schematic diagram showing a wireless IMU network with a rigid body or with one gyroscope at center, in accordance with some embodiments.
Figure 11:
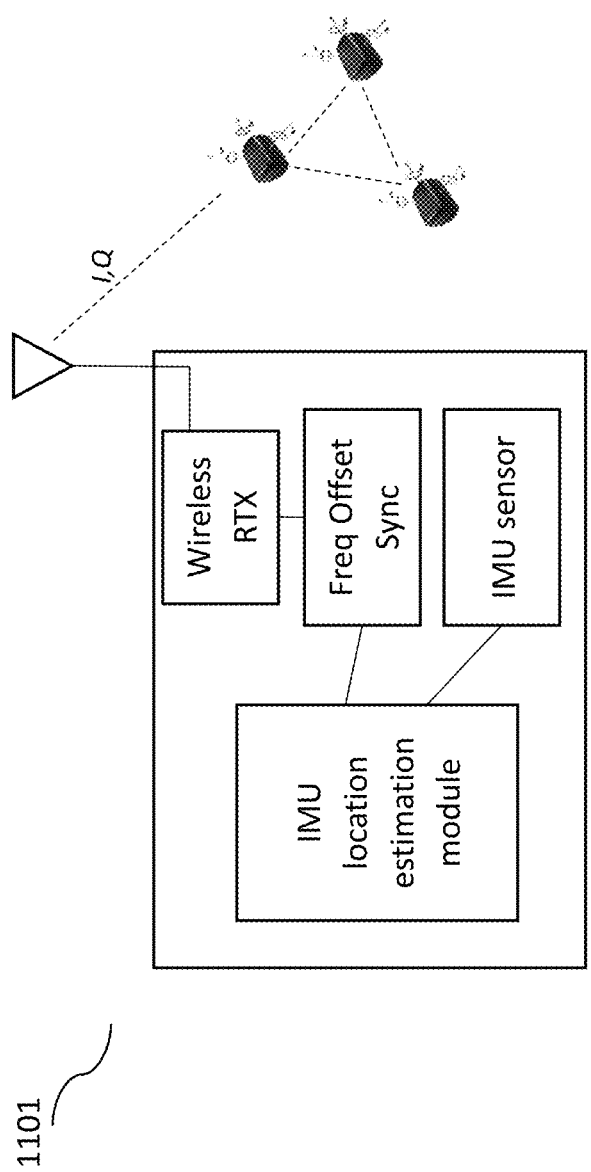

In case that the distributed IMUs are attached to the rigid body with known relative distance information, we can provide the synchronized IMU network and combine the multiple IMUs measurement for better performance, as shown in FIG. 10b;

In case that the multiple IMUs are attached to the multiple mobile nodes, we not only can provide the synchronization among the IMUs, but also can calculate the relative positions among the IMUs for combining, as shown in FIG. 10a. In this sense, we can dynamically process the distributed IMUs even if they are not attached to a rigid body. This feature opens a lot of applications beyond current technologies which are mostly limited to the rigid body assumption.

Our system can be deployed in environments where the single high precision gyroscope cannot be used due to its size and weight.

Our ultimate goal is to significantly improve navigation accuracy using multiple small, low cost IMU sensors (FIG. 10a) that can provide accurate estimation of rotation and location that is equivalent to one high precision, high cost, heavy gyroscope (as shown in the middle of FIG. 10b).

The stacked filter architecture in [3] is the way to combine the multiple IMUs. The sync among multiple IMUs is very important and has a big impact on the location performance as addressed in [3]. This is also a highlight spot from this application.

In this patent application, we intently to combine the mesh-network location algorithm with IMU to improve the location accuracy. Certainly, it will be beneficial to combine with more technologies such as GPS to enhance the performance in some applications when GPS is available. However, the study of the complexity and benefit will be taken into account in details.

In some embodiments, the present disclosure could be equipped as part of: mobile vehicles; space vehicles, including satellites and landers; aircraft, including airborne drones and UAVs; any type of mobile drone, including consumer robots and appliances; measuring devices; cameras, including reconnaissance cameras, space cameras, aerial cameras; sports training technology; animation and motion capture; and/or autonomous balancing devices.

In some embodiments, the present disclosure could be used in conjunction with GPS, GLONASS, any satellite- or non-satellite-based position determination system, dead reckoning, inertial navigation systems, attitude and heading reference systems, etc. to provide a primary or redundant source of position information. In some embodiments, data from multiple positioning systems as described in this paragraph and throughout this disclosure could be combined using sensor fusion to synthesize a more-accurate position as compared to a position determination system without the use of the present disclosure. In some embodiments, the present disclosure could be used with a satellite positioning system to provide location information when a clear line of sight to satellites is not available, for example, when a vehicle is underground or when a device is indoors.

As used herein, the word "synthetic" is used to mean a measurement device that incorporates measurements from a plurality of measuring devices to produce a measurement that combines the plurality of inputs.

In operation, for example with a plurality of mobile users hosting synced IMUs, they provide I/Q info and they can do sync, locally. They also estimate time of arrival information and they will send this information to a gateway. The gateway integrates the information using the more complicated algorithm.

Combining IMU data from multiple IMUs, e.g., at a location estimation module, is understood by the inventors to be well-known in the art and can be accomplished at least using the algorithms detailed in, at least, Jared B. Bancroft and Gérard Lachapelle, "Data Fusion Algorithms for Multiple Inertial Measurement Units", Sensors, MDPI, 2011; 11(7): 6771-6798; Bancroft, J. B. Multiple Inertial Measurement Unit Integration for Pedestrian Navigation. Ph.D. Thesis, Department of Geomatics Engineering, The University of Calgary: Calgary, AB, Canada, 2010; and "Redundant IMUs for Precise Trajectory Determination," Colomina et al., Institute of Geomatics Generalitat de Catalunya & Universitat Politécnica de Catalunya Castelldefels, Spain, 2004, each of which is hereby incorporated by reference in its entirety for all purposes. Also hereby incorporated by reference in its entirety for all purposes are the following: Manon Kok et al., "Using Inertial Sensors for Position and Orientation Estimation," arXiv:1704.06053v2 10 Jun. 2018; Sturza, Mark, "Skewed axis inertial sensor geometry for optimal performance; geometry configuration," American Institute of Aeronautics and Astronautics, October 1988; and Jian Cui, Joshua Park, "Blind carrier synchronization method for OFDM wireless communication systems" U.S. Pat. No. 9,538,537. In some embodiments the algorithm will take care of this issue by detecting the failure of IMU, changing the combine algorithm accordingly.

The inventors have also understood that the present technology can also be incorporated into a "mega gyro," a single system that acts as a synthetic IMU for a large rigid body without the expense of one or more large gyroscopes. Having several small, inexpensive sensors that are highly synchronized that can be used to provide a more-accurate IMU for any body of any size and any material is commercially valuable.

In some embodiments, a gateway can host a location estimation module. In other embodiments the location estimation module can be at one or more nodes. In some embodiments time of arrival may be used without a timestamp or with a timestamp to estimate distance; to estimate distance without a timestamp, we use a previously-received wireless signal, such as an OFDM signal, to synchronize the two nodes to enable precise distance determination. In some embodiments an algorithm assumes that precise synchronization is achieved among the nodes. In some embodiments, the distance information among/between nodes is sent to the location estimation module.

The inventors have understood and appreciated that the prior art, namely Park (U.S. Pat. No. 9,048,979), utilizes the orthogonality of I and Q within a received IQ signal in the time domain to characterize a frequency offset of the received IQ signal. However, the method of Park is a single-carrier method and is not directly applicable to OFDM modulated signals, which are multi-carrier, frequency modulated and multiplexed. Orthogonality is present, but is not apparent from the I and Q signals directly because the orthogonality is between I and Q of each subcarrier, not between the I and Q of the frequency-multiplexed signal. The orthogonality of I and Q of the multiplexed signal is not independent but is dependent on the underlying subcarriers. To solve this problem, certain methods utilized herein separate out each of the paired I and Q information signals that are present in the frequency-multiplexed OFDM signal before computing cross-correlation according to the Park method. This results in a method that permits blind frequency synchronization even for frequency-multiplexed signals.

In one embodiment, a system at a receive circuit is configured to perform synchronization based on a received signal as follows. A received signal is downconverted to baseband and broken up into a series of OFDM symbols, the number of symbols based on an arbitrarily-configured number sufficient to cause the synchronization algorithm to converge to within a certain error range, such as +/−5 ppb. The OFDM symbols are initially in the time domain. A fast Fourier transform (FFT) is performed to turn these time domain symbols into OFDM symbols in the frequency domain. As one OFDM symbol is made up of a block of several frequency domain samples, a block of several time-domain samples is transformed via FFT into one OFDM symbol (based on the preconfigured number of subcarriers in the OFDM signal).

Once a series of frequency domain OFDM symbols is created via FFT, each of these symbols is fed into the method of Park and a cross-correlation is summed over each subcarrier over a number of the frequency domain OFDM symbols.

The cross-correlation is computed as the sum of the products of either a square or absolute value of the in-phase and quadrature samples. This sum may also be considered a cumulative phase measurement.

The cross-correlation is summed across the series of symbols and across all subcarriers to determine a frequency offset for the entire received signal.

In some embodiments a subset of the received symbols may be discarded, for instance, repeated symbols that have been inserted for carrier synchronization, or symbols located by frequency in the middle of a transmission band. In some embodiments, the synchronization procedure may be initiated at device power on, upon signal acquisition, at scheduled intervals, or upon detecting a loss of synchronization, in some embodiments with the same number of input samples being used each time the synchronization procedure is performed. The method is generally applicable to OFDM signals of different bandwidths, to QAM modulation or other types of modulation, and to other frequency domain multiplexing techniques aside from OFDM.

The disclosed method is suitable for use with OFDM or other spread spectrum multi-carrier transmission techniques. The disclosed method may be applied across Wi-Fi, LTE, or other waveforms and radio transmission techniques. As described, the method may help to achieve superior time synch, may help in implementation of a superior positioning method through better time synchronization, and may permit better network synchronization via more precise frequency offset correction.

As with Park, the disclosed method has the advantage that it is a purely blind synchronization method that does not require a special beacon signal or preamble, instead relying on a purely stochastic approach that can be adapted to virtually any signal. The disclosed method is also superior to existing beacon-based methods in that it utilizes the entire signal energy of the received signal.

The disclosed method works with any type of QAM modulation, e.g., QPSK, 16 QAM, 64 QAM, 256 QAM, and other types of QAM modulation. The disclosed method also can use a subset of the available subcarriers to achieve synch, requiring only that a certain number of samples be available for processing. This permits the method to be used by an individual user that may not have access to all available subcarriers, e.g., a user equipment (UE) on an LTE network, which typically only has a small fraction of the available bandwidth at any time.

In this document, we consider the IEEE 802.11g WLAN OFDM system as an example system which can be enhanced as follows. The methods and conclusions herein can be applied to any OFDM-based system. As used herein, the term OFDM shall refer to any orthogonal frequency division multiplexing scheme, including but not limited to commonly known OFDM schemes.

Figure 1:
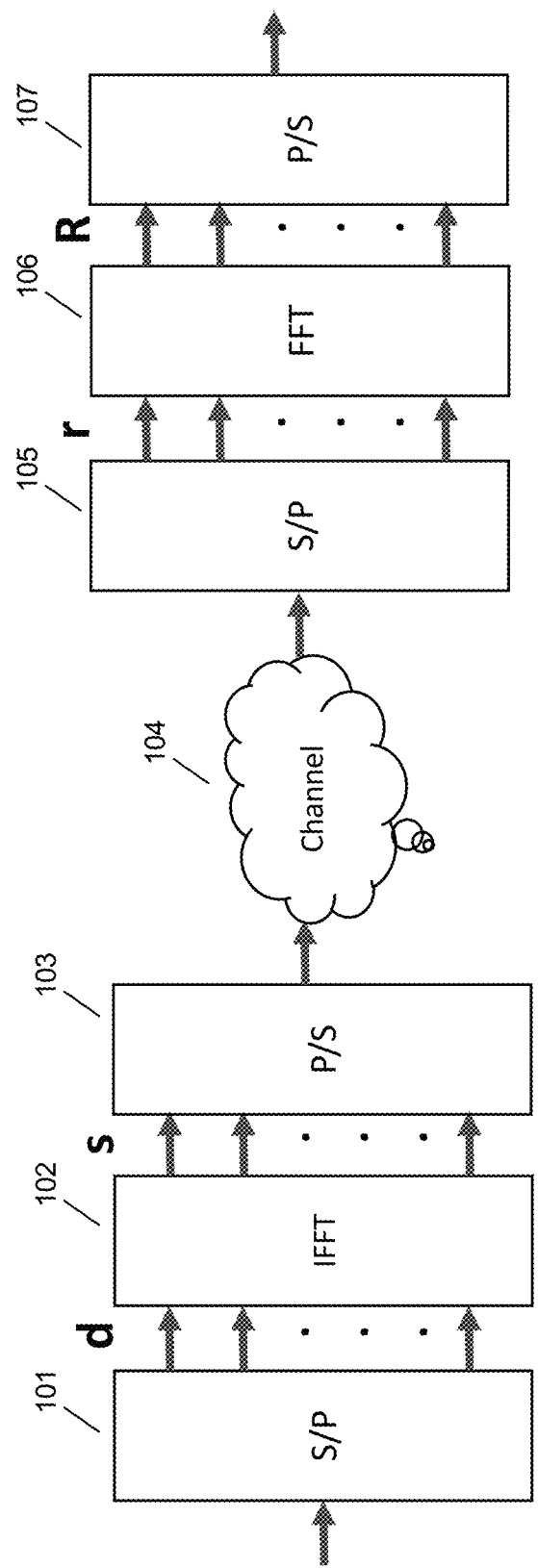
FIG. 1 is a block diagram of a general OFDM-based system.

FIG. 1 shows a generic OFDM system block diagram. S/P stands for serial to parallel conversion, FFT stands for Fast Fourier Transform, P/S stands for parallel to serial conversion, and IFFT stands for Inverse Fast Fourier Transform. Block 101 is a serial-to-parallel block which receives a series of digital bits from over a digital interface from a computer or other digital device. S/P 101 takes the original bits, which arrive already modulated (details not shown) in a single frequency domain stream, splits them into several digital streams, and sends them to inverse FFT block 102.

IFFT 102 takes a set of digital bits (a "block") in the time domain and applies an IFFT function, turning them into symbols in the time domain. Parallel to serial block 103 takes the set of symbols from IFFT 102 and multiplexes them into a single stream of symbols in the time domain using an OFDM modulation. The multiplexed single stream is sent over channel 104, which may be an air interface such as Wi-Fi or LTE, to a receiver. Details of the receive and transmit chains, such as upconversion and downconversion to/from carrier frequency, amplification, antennas, etc. are omitted in this diagram.

On the receive side, serial/parallel block 105 receives the output of an antenna and receive chain (not shown). The received signal is a series of symbols in the time domain. FFT 106 takes the received signal and transforms it from the time domain to the frequency domain, then sends it to parallel to serial block 107, which separates out the different frequency multiplexed symbol streams.

The sequence $d=[d_0\ d_1\ d_2\ \ldots\ d_{N-1}]$ is a sequence of complex numbers that represents the constellation points of data signals in the frequency domain. The output of the IFFT block is the signal of N samples:

$$s(k)=\Sigma_{i=0}^{N-1} d_k e^{j2\pi i k/N}; k=0,1,\ldots,N-1 \quad (1)$$

Where $d_k$ stands for OFDM symbol on the k'th subcarrier, N is the number of total sub-carriers. In case of AWGN channel and without CFO and SFO, the received signal can be expressed as:

$$r(k)=s(k)+n(k), \quad (2)$$

for the OFDM demodulator, where n(k) is the complex Gaussian noise.

At the receiver side with ideal frame synchronization, the transmitted signal can be recovered by FFT:

$$R(i)=\Sigma_{k=0}^{N-1} r(k) e^{-j2\pi k i/N}; i=0,1,\ldots,N-1 \quad (3)$$

Finally, we have:

$$R(i)=d_i+n_i, i=0,1,\ldots,N-1 \quad (4)$$

where $n_i$ is the complex Gaussian noise.

However, if the sampling frequencies at DAC and ADC are different due to the transmitter and receiver using different local oscillators, CFO and SFO exist in the baseband signal at the output of the ADC. The impact of the sampling frequency difference on the baseband signal quality will be explained next.

In the presence of a CFO of $\Delta f_s$ and a SFO of $\varepsilon_s$, the time domain samples r(k) is given by:

$$r(k)=\Sigma_{i=0}^{N-1} d_i e^{j2\pi(i+\Delta f_s)k(1+\varepsilon_s)/N}; k=0,1,\ldots,N-1 \quad (5)$$

Where $\Delta f_s$ represents relative frequency offset normalized by fs/N, $\varepsilon_s$ represents the relative sampling frequency error $$\varepsilon_s = \frac{\Delta f_s}{N},$$

and fs is the sampling frequency. For simplicity, here it is assumed that both CFO and SFO stem from the same frequency source error. The method presented in this document can be easily extended to the case that both CFO and SFO are independent. Focusing the impact of SFO, at the output of FFT, we have [2]:

$$R(m) = e^{-j\pi\frac{N-1}{N}m\varepsilon_s} \frac{\sin(\pi m\varepsilon_s)}{\sin\left(\frac{\pi m\varepsilon_s}{N}\right)} d_m + W(m) + \quad (6)$$

$$\sum_{\substack{i=0 \\ i\neq m}}^{N-1} d_i \frac{\sin(\pi m\varepsilon_s)}{\sin\left(\frac{\pi[i(1+\varepsilon_s)-m]}{N}\right)} e^{j\pi\frac{N-1}{N}i\varepsilon_s} e^{-\frac{j\pi(i-m)}{N}};$$

$$m = 0, 1, \ldots, N-1$$

Three different effects can be observed from equation (6): An amplitude attenuation by a factor of $$\frac{\sin(\pi m\varepsilon_s)}{\sin\left(\frac{\pi m\varepsilon_s}{N}\right)},$$

A phase shift of symbol $d_m$;

An inter-carrier interference (ICI) due to a loss of orthogonality between the sub-carriers. (The third term in equation (6)).

Figure 2:
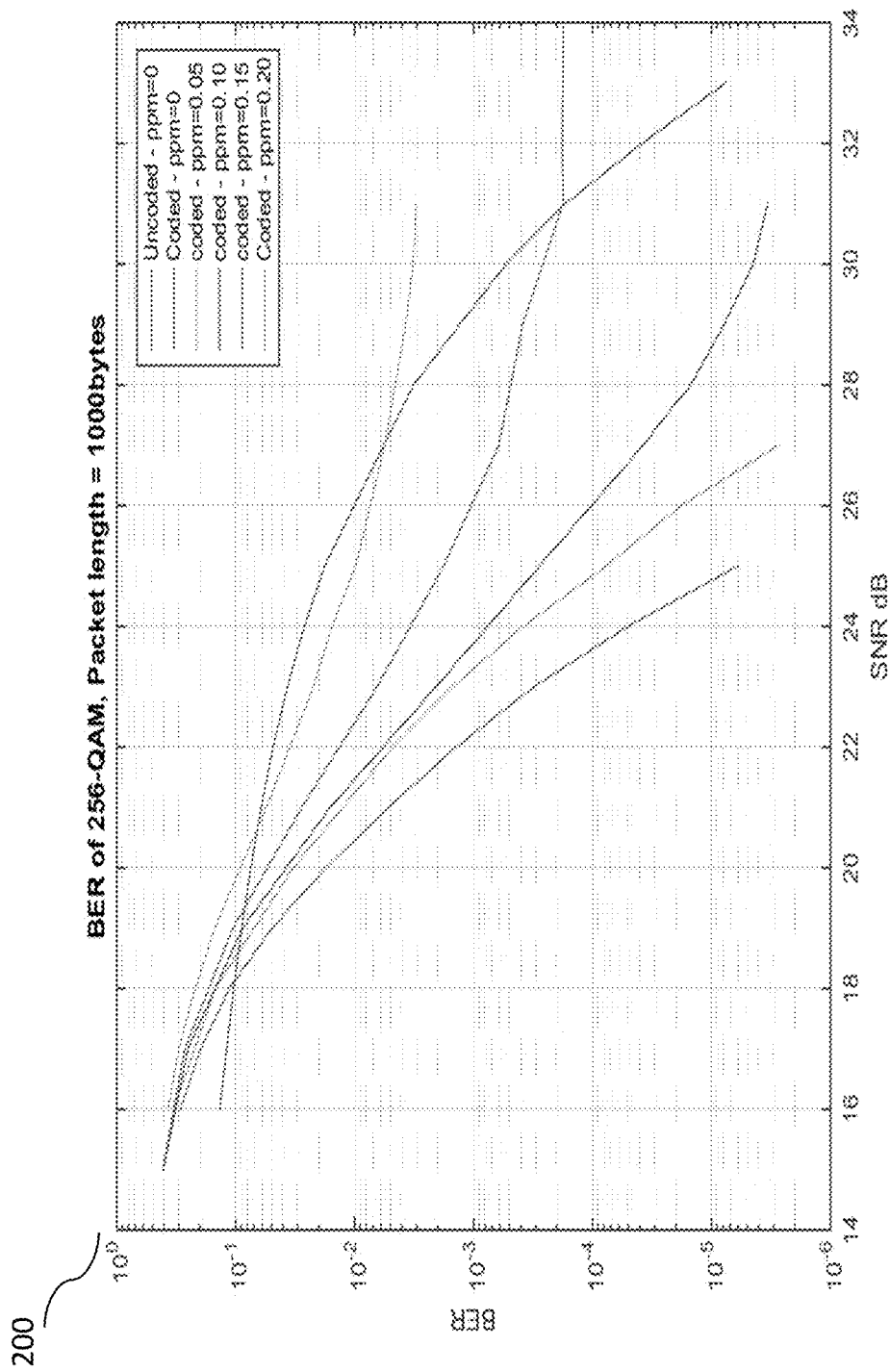
FIG. 2 is a bit error rate (BER) performance of IEEE 802.11g in the presence of carrier frequency offset (CFO), in accordance with some embodiments.

The performance degradation in terms of SNR is shown in FIG. 2, showing a BER of 256 QAM with a packet length of 1000 bytes. As an example, shown as plot 200, the IEEE 802.11g-based OFDM system is simulated with coding rate of r=½. The standard requires that for frame length of 1000 octets, the BER should be equal to or less than 10^(−5). Our system simulation results in FIG. 2 show that with carrier frequency offset of 100 ppb, 4 dB SNR degradation is observed at BER of 10^(−5) versus a system without CFO.

If the frequency offset is larger than 150 ppb, the system can never reach a BER of 10^(−5) requirement even with high SNR.

Figure 3:
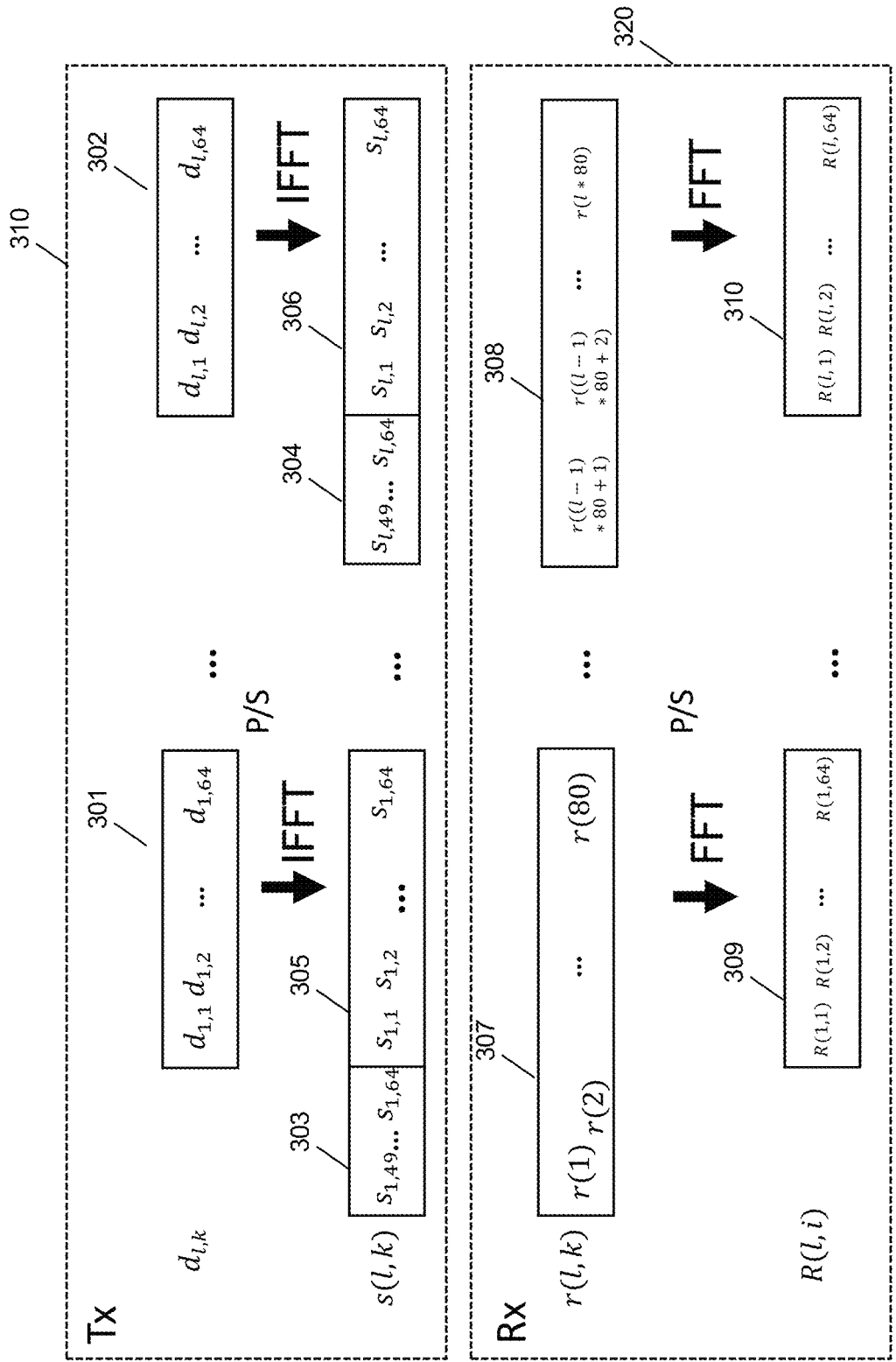
FIG. 3 illustrates a signal processing flow in some embodiments of an improved OFDM system.

FIG. 3 illustrates a signal processing flow in some embodiments of an improved OFDM system. As shown in FIG. 3, we use IEEE 802.11g as an example to show signal processing flow in an exemplary OFDM system. Area 310 represents a series of steps performed at a transmitting node and area 320 represents a receiving node. Signal 301 is a digital baseband frequency domain signal, numbered $d_{l,k}$, where l is the symbol number and k is a sample number. Signal 302 is also a digital baseband frequency domain signal, where l is the symbol number and represents the last in a series of symbols from 1 to l. The value of l can be varied based on configuration of the system, with tradeoffs: without a sufficient number of symbols, synchronization may not be achieved to a desired level of accuracy, but processing more symbols requires greater sampling time and processing time.

At the transmitter side, frequency modulated signals $d_{l,k}=[d_{l,1}\ d_{l,2}\ \ldots\ d_{l,64}]$ are transformed to a time domain signal s(l,k), k=1, . . . , 64, by IFFT, shown as samples 305. The last 16 samples of s(l,k), 303 is inserted at the front of the 64-sample block signal to form one OFDM symbol in the time domain. This operation results in simple channel equalization in OFDM system. Samples 303, 305 are a first symbol in the frequency domain and the time domain, respectively, and samples 304, 306 are an lth symbol in the frequency and the time domains, respectively.

At the receiver side, data sequence r(l,k) is received in time domain after ADC. R(l,i) is obtained after FFT based on frame synchronization information. Symbol 307 in the time domain is 80 samples long due to a need for frame synchronization; after FFT into the frequency domain, transformed symbol 309 is 64 samples long. Symbols 307 and 309 are a first symbol, i.e., l=1; symbols 308 and 310 are an lth symbol for the highest allowed value of l, in the time domain and the frequency domain, respectively. The coefficients of symbol 308 reflect the fact that the total number of samples collected for any one iteration of the present offset detection/synchronization algorithm is l*80.

Assuming the sampling frequency is Fs and the FFT size is N for the OFDM system, the received signal in the frequency domain with frequency offset error of ε can be expressed as in [4], as:

$$R(l, i) = e^{-jv_l\varepsilon\left(1+\frac{i}{N}\right)}H_i d_{l,i} + W(l, i), \quad (7)$$

$$i = 0, 1, \ldots, 63;\ l = 1, 2, \ldots, N_{ofdm}$$

Where, $$v_l = \pi\frac{N-1+2N_l}{N};$$

$N_l=lN_s+N_g$; l is number of OFDM symbols, i is the number of subcarrier indices within each OFDM symbol, $N_g$ is the guard interval length with $N_s=N+N_g$, $N_{ofdm}$ is the number of OFDM symbols in one data frame, and $H_i$ is the channel response in subcarrier of i. For example, in an IEEE 802.11g WLAN system, N=64; $N_g$=16. Again, here it assumed that both CFO and SFO are from the same local oscillator error.

Removing the constant phase rotation applied to every signal and the noise term, the equation (7) can be simplified to:

$$R(l, i) = e^{-j2\pi lN_s\varepsilon\left(1+\frac{i}{N}\right)}H_i d_{l,i}, \quad i = 0, 1, \ldots, 63;\ l = 1, 2, \ldots, N_{ofdm} \quad (8)$$

For a given i=m, we can define a new sequence in time index of l by taking every 64th sample from R(l,i) as:

$$R(l,m)=e^{-j2\pi l\varepsilon_m}H_m d_{l,m}, l=1,2,\ldots,N_{ofdm} \quad (9)$$

where $$\varepsilon_m = \varepsilon N_s\left(1+\frac{m}{N}\right).$$

Since $\varepsilon_m$ is unknown, we can form a new sequence with potential frequency offset of ε'. Define $\Delta\varepsilon_m=\varepsilon_m-\varepsilon'_m$ and $$\varepsilon'_m = \varepsilon' N_s\left(1+\frac{m}{N}\right).$$

Multiplying Equation (9) by $e^{j2\pi l\varepsilon'}$, we have:

$$U(l,m,\varepsilon')=R(l,m)e^{j2\pi l\varepsilon'_m}=e^{-j2\pi l\Delta\varepsilon_m}H_m d_{l,m}, l=1,2,\ldots,N_{ofdm} \quad (10)$$

We define the real and imaginary part of equation (9) as:

$$I(l,m)=\text{real}(H_m d_{l,m})$$

$$Q(l,m)=\text{imag}(H_m d_{l,m}), l=1,2,\ldots,N_{ofdm} \quad (11)$$

We rewrite the real and imaginary part of equation (10) as $$I_R(l,m,\varepsilon')=\text{real}(U(l,m,\varepsilon'))=I(l,m)\cos(2\pi l\Delta\varepsilon_m)-Q(l,m)\sin(2\pi l\Delta\varepsilon_m)$$

$$Q_R(l,m,\varepsilon')=\text{imag}(U(l,m,\varepsilon'))=Q(l,m)\cos(2\pi l\Delta\varepsilon_m)+I(l,m)\sin(2\pi l\Delta\varepsilon_m) \quad (12)$$

We define the objective function as the following cross-covariance between $I_R(l,m,\varepsilon')^2$ and $Q_R(l,m,\varepsilon')^2$:

$$J(\Delta\varepsilon_m)=C(A,B)=\Sigma_l\{(A-\mu_A)(B-\mu_B)\}, \quad (13)$$

where:

$$A=\{I_R(l,m,\varepsilon')\}^2 \text{ and } B=\{Q_R(l,m,\varepsilon')\}^2 \quad (14)$$

We also define:

$$\Sigma_l\{A\}=\mu_A \text{ and } \Sigma_l\{B\}=\mu_B \quad (15)$$

with the assumption that $\mu=\mu_A=\mu_B$.

Following the same procedure in [1], we have:

$$J(\Delta\varepsilon_m) = \mu^2\Sigma_l\left\{\frac{1+\cos 8\pi\Delta\varepsilon_m l}{2}\right\}-\mu^2 \quad (16)$$

The cross-covariance of $J(\Delta\varepsilon_m)$ becomes zero when $\Delta\varepsilon_m=0$, which equals to ε'=ε in equation (10).

In the same way, we can define the objective function as:

$$J(\varepsilon')=\Sigma_m J(\Delta\varepsilon_m) \quad (17)$$

In equation (17), the summation is made for all possible non-empty bin index of m. For example, in an IEEE 802.11g system, only 52 out 64 bins are used. In this case, we can fully use all data from all available bins in the frequency synchronization. It turns out that, as expected, higher accuracy synchronization is achieved by using more bins.

Mathematically, the equation (16) can also be rewritten to find $\varepsilon_m$, as maximum:

$$\max_{\varepsilon_m} J_1(\Delta\varepsilon_m) = \sum_l \{AB\} = \mu^2 \sum_l \left\{\frac{1+\cos 8\pi\Delta\varepsilon_m l}{2}\right\} \quad (18)$$

The objective function will achieve its maximum value when $\varepsilon'_m = \varepsilon_m$. In the same way, the equation (17) can be rewritten as $$J(\varepsilon') = \Sigma_m \Sigma_l \{AB\} \quad (19)$$

where l is the index for OFDM symbols, and m is the index for the subcarrier index within each OFDM symbol.

Next, we will provide variations of equation (19). It is noted that the equation (19) can be written as:

$$\max_{\varepsilon' \in [f_1; f_2]} J(\varepsilon') = \sum_m \sum_l \{AB\} = \sum_m \sum_l \{I_R(l,m,\varepsilon')\}^2 \{Q_R(l,m,\varepsilon')\}^2 \quad (20)$$

Where [f1, f2] is the frequency range of interest. Equation (20) can be rewritten as:

$$\max_{\varepsilon' \in [f_1; f_2]} J(\varepsilon') = \sum_m \sum_l \{AB\} = \sum_m \sum_l |I_R(l,m,\varepsilon')Q_R(l,m,\varepsilon')|^2 \quad (21)$$

and mathematically equation (21) is equivalent to maximizing the following objective function:

$$\max_{\varepsilon' \in [f_1; f_2]} J(\varepsilon') = \sum_m \sum_l |I_R(l,m,\varepsilon')Q_R(l,m,\varepsilon')| \quad (22)$$

It is also the same as maximizing this second objective function as well:

$$\max_{\varepsilon' \in [f_1; f_2]} J(\varepsilon') = \sum_m \sum_l |I_R(l,m,\varepsilon')| \, \| \, Q_R(l,m,\varepsilon')| \quad (23)$$

Figure 4:
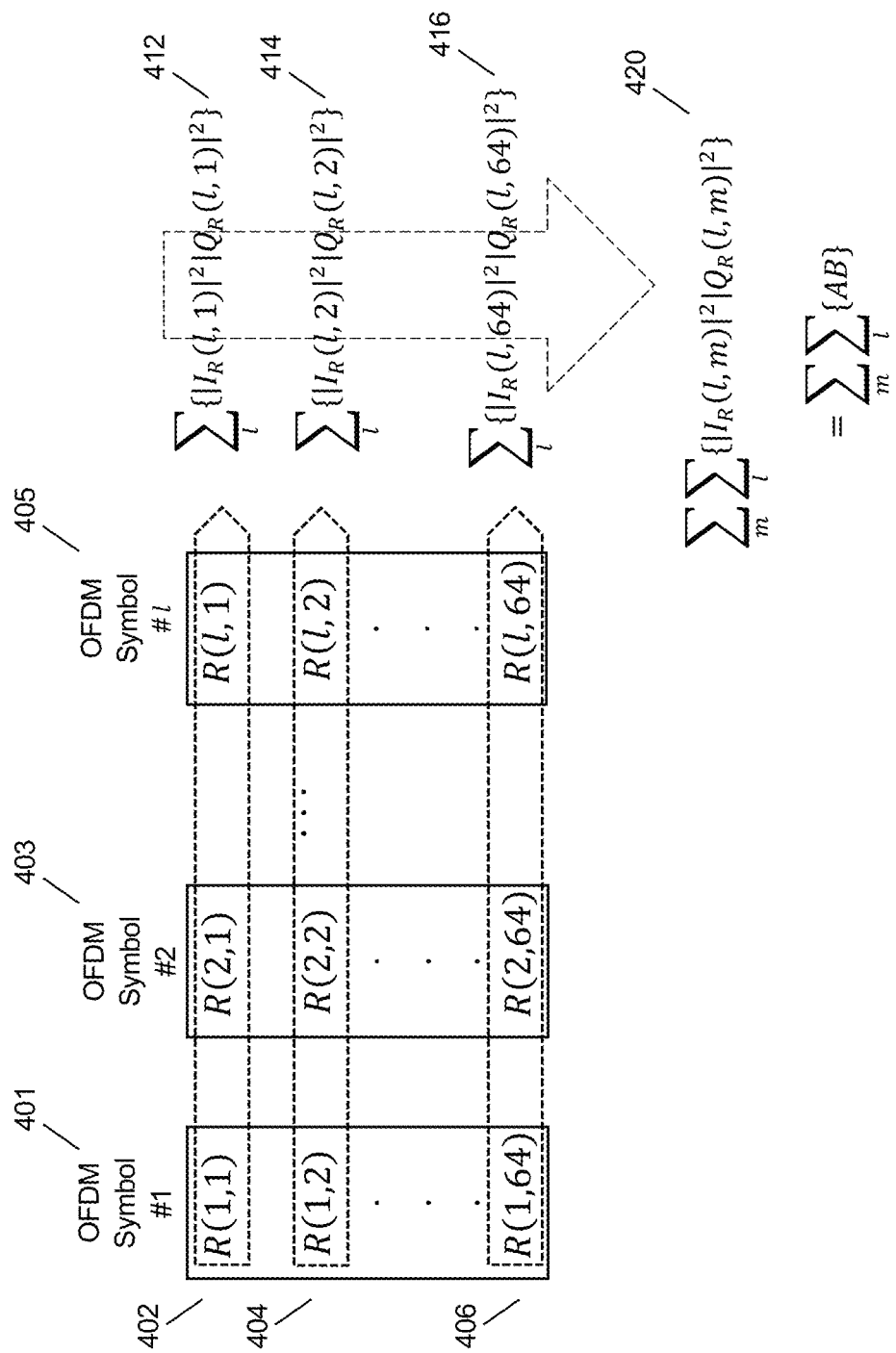
FIG. 4 is a schematic illustration of the operations of equation (20), in accordance with some embodiments.

FIG. 4 is a schematic illustration of the operations of equation (20), in accordance with some embodiments. OFDM symbol #1 401 is made up of multiple frequency subcarriers 402, 404, 406, with subcarrier 402 having subcarrier number 1 and subcarrier 406 having subcarrier number 64, the highest subcarrier number in this diagram. Similarly, OFDM symbol #2 403 and all symbols up to and including OFDM symbol #1 405 are also made up of 64 subcarriers.

On the right of the diagram, equation 412 reflects the fact that the squared absolute values (i.e., the cross-correlation according to Park) of every symbol having subcarrier number 1 are summed. Equations 414 and 416 reflect the summation of cross-correlations of every subcarrier across each OFDM symbol, with equation 420 reflecting the summation of cross-correlations across both every subcarrier and every symbol. In some embodiments, squared absolute values may be used; in other embodiments, absolute values may be used without squaring, according to Park.

Figure 5:
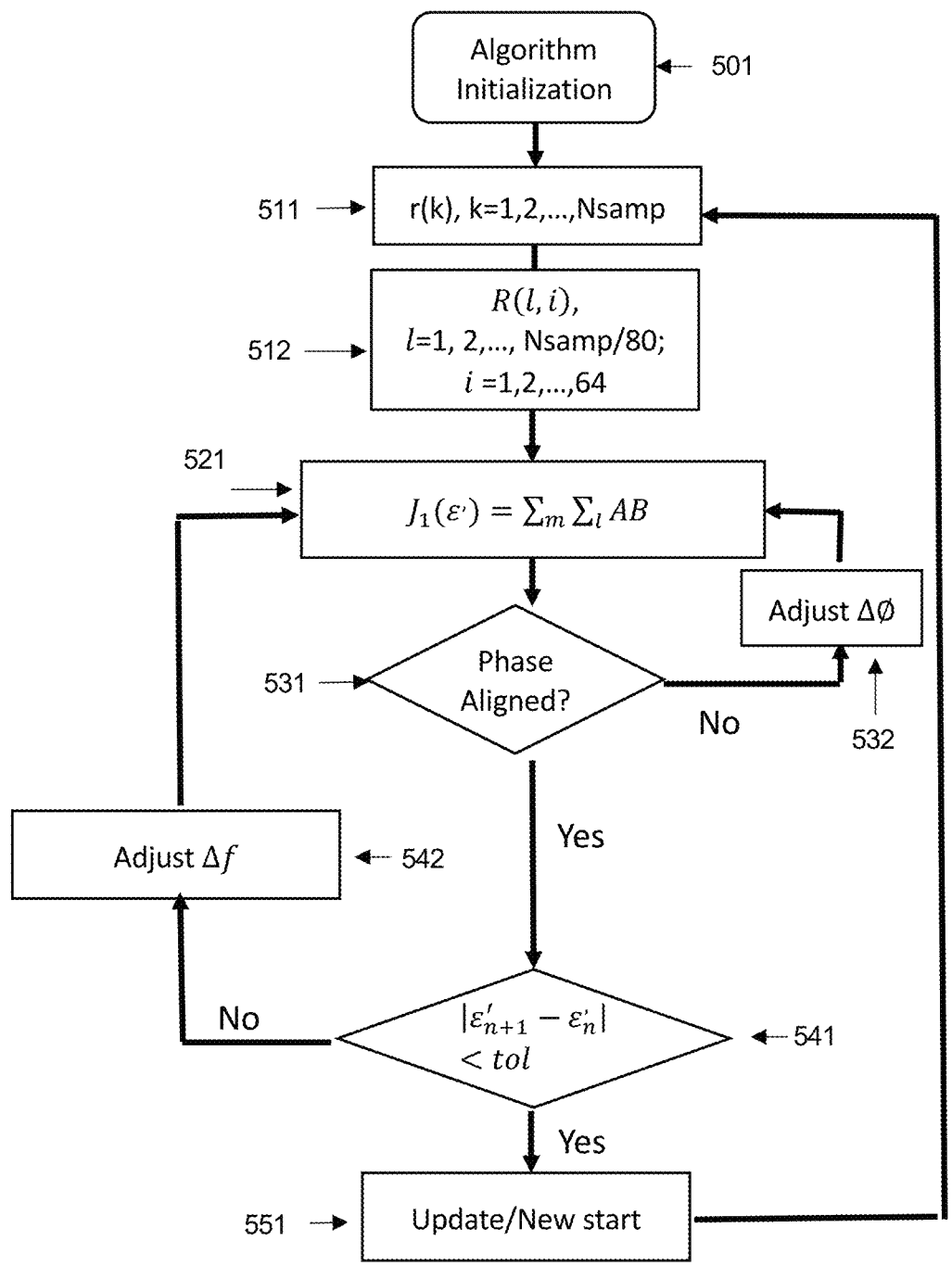
FIG. 5 is a flow chart of a frequency and phase synchronization procedure, in accordance with some embodiments.

FIG. 5 is a flow chart of a frequency and phase synchronization procedure, in accordance with some embodiments. The detailed frequency synchronization procedure is as follows.

At step 501, the algorithm initialization function 501 defines the algorithm parameters used in synchronization process.

Nsamp is the total number of samples used in the synchronization process.

[f1 f2] is the target frequency range of frequency offset. For example, the IEEE 802.11g standard defines the maximum frequency offset in term of ppm to be −/+20 ppm. In this case, f1=−48 kHz, f2=48 kHz.

Δf is the step size for searching the frequency range of interest. These three numbers are adaptively reduced to minimize complexity of computation and meet accuracy requirements for specific communication systems.

Initial phase value. This is set to zero. In application, there always exists a constant phase difference between the transmitter and receiver in addition to the CFO and SFO. The phase difference is caused by the different sampling time at the transmitter and receiver, and air propagation. The phase difference sometimes also refers to the symbol timing and needs to be aligned at the receiver.

ΔØ is the step size for phase alignment. This number, like Δf, is adaptively adjusted. A larger value means fast alignment but with less resolution. A small value means high resolution and more computational complexity. It is normally selected to be a larger ΔØ at the initial phase alignment stage and a smaller ΔØ for higher accuracy of phase alignment.

At step 511, a signal of r(k) in equation (2) is acquired, which can be sampled at 1×, 2× or 4× of the basic sample rate at the ADC output in the receiver.

At step 512, the time domain signal r(k) is converted into a frequency domain signal of R(l,i) by FFT operation based on frame synchronization information. l is the number of OFDM symbols within one data frame and i is the subcarrier index within each OFDM symbol.

At step 521, firstly, the operation defined in equation (20) to cross over the number of OFDM symbols l and the subcarrier index i for the possible frequency range and defined step size is performed. The outputs of step 521 are the maximum value of equation (20) and its associated frequency. Secondly, the phase alignment is rotated with equation (20) until a new max value occurs. Details regarding this phase alignment step are addressed in U.S. Pat. No. 9,048,979, Park. This summation across both all samples and all symbols expresses the use of cross-correlation or orthogonality to determine phase offset.

At step 532, the direction of phase change and its resolution are tuned. The increase or decrease of phase value will be determined by the comparison between the max values of equation (20) with the differing phase value. For example, at the kth value of phase, if the max value of J1 is less than the max value of J1 at the (k−1)th phase value, the phase value will be decreased at the next round of search. ΔØ is the step size for the phase alignment process.

At step 551, it is determined whether the synchronization process is complete. If the differences of (M) consecutive maximum values of equation (20) are less than a predefined threshold value, the synchronization process finishes. Otherwise, processing goes to circuit 142 by reducing the frequency search resolution and performing the synchronization process using circuit 121 again. A control operation is also performed to determine if an update is needed, or if a new synchronization process should be started. A new update or synchronization process may be performed, for example, upon power on of an antenna, upon connection to a new radio source, after a certain configurable time interval, or after other events that would be expected to produce de-synchronization.

The systems and methods presented here can be applied to any single carrier system with complex signals at the receiver, and specifically to a multi-carrier based OFDM communication system. This method can be described as a blind synchronization method for a single carrier OFDM based system. For a given OFDM based system, only frame synchronization information is needed. After frame synchronization is done, each time-domain OFDM symbol can be detected and FFT operation can be applied without decoding the symbols. The raw samples after FFT can be used for frequency synchronization directly without any additional information.

For most OFDM systems, some form of channel equalization is also possible using known preambles/pilots before high-precision CFO and SFO correction is done. In such cases, the channel components in equation (10) R(l,i) can be removed. Simulations show that the performance of our method can be improved in conjunction with channel equalization techniques.

System Simulation Results

To demonstrate the performance of the proposed method for the frequency synchronization, simulation is conducted using an IEEE 802.11g system as an example. QPSK and 64-QAM signals are used in the simulation to show that the method can work for any type of modulation signal in the OFDM system. Only frame synchronization information is used in the simulation for the random chosen frequency offset. It is apparent from FIGS. 6 and 7 that for both 4-QAM and 64-QAM OFDM signals, the accuracy of frequency estimation can be achieved within single digit of ppb levels with a SNR of only 5 dB.

Figure 6:
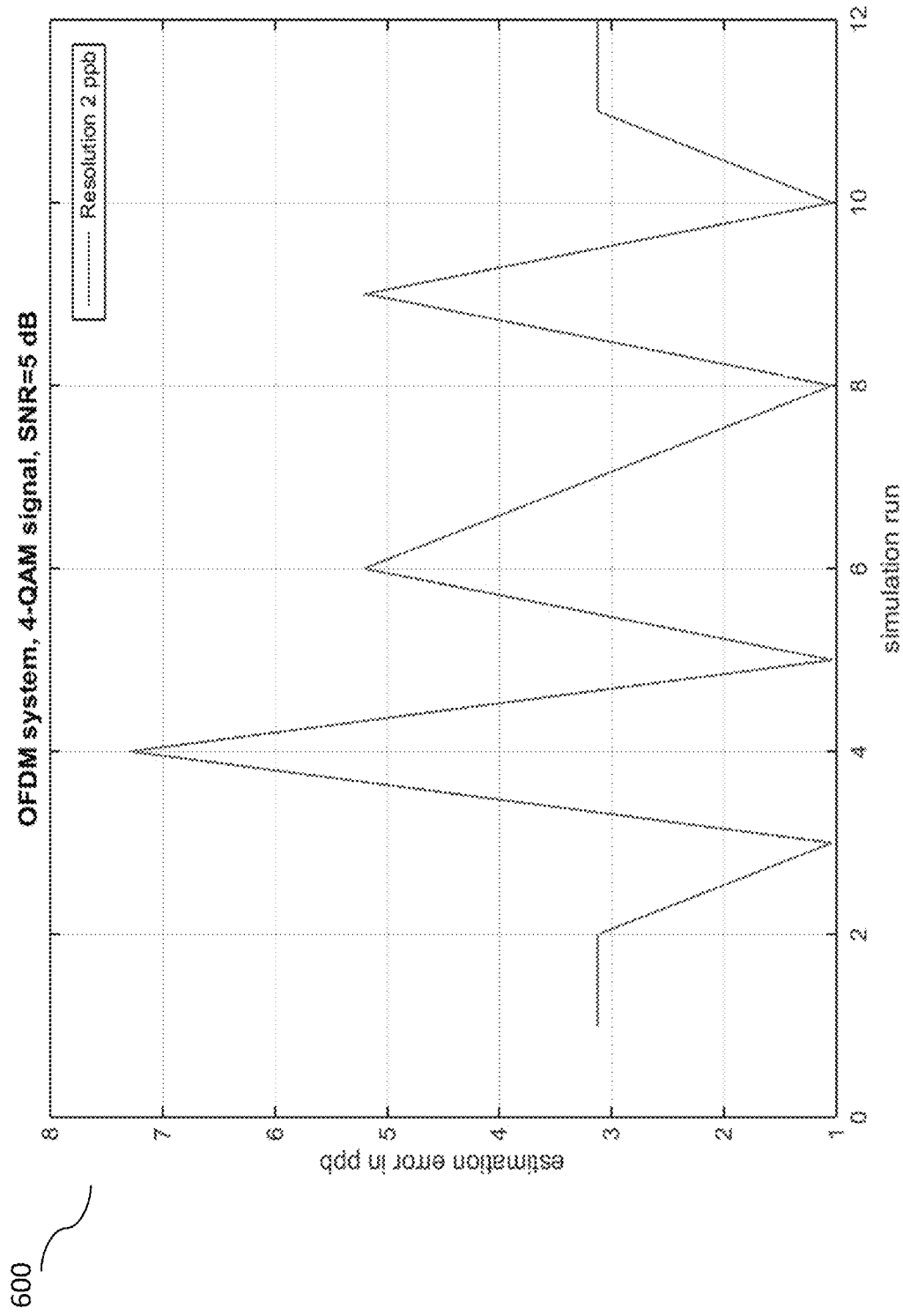
FIG. 6 is a simulated performance plot of frequency synchronization of an OFDM system with QPSK, in accordance with some embodiments.

FIG. 6 is a simulated performance plot of frequency synchronization of an OFDM system with QPSK, in accordance with some embodiments. The depicted system is an OFDM system with a 4-QAM signal, with a SNR of 5 dB. After roughly 12 simulation runs, it appears that the simulation has settled down to an estimation error of roughly 3 to 5 parts per billion.

Figure 7:
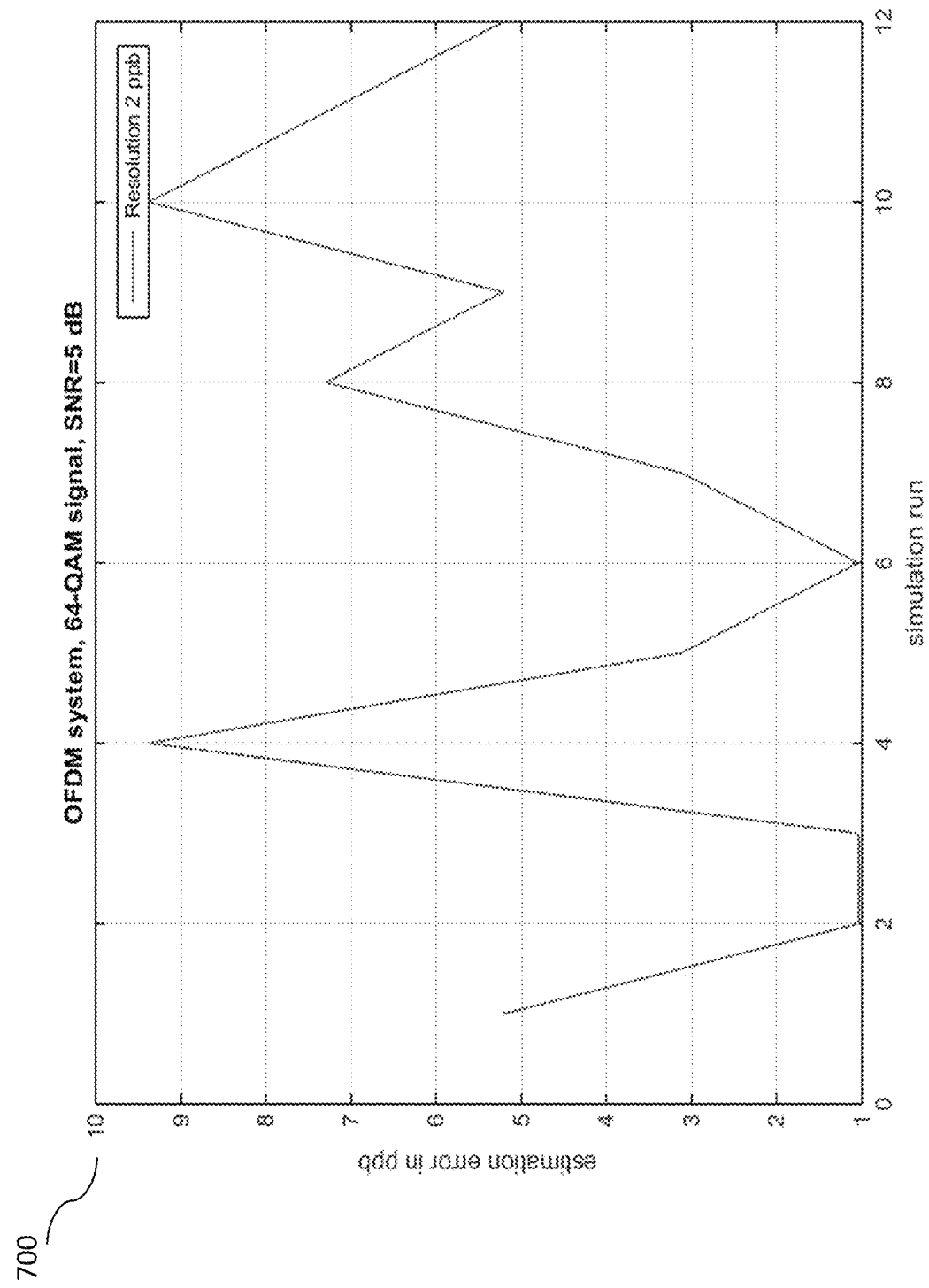
FIG. 7 is a simulated performance plot of frequency synchronization of an OFDM system with 64-QAM, in accordance with some embodiments.

FIG. 7 is a simulated performance plot of frequency synchronization of an OFDM system with 64-QAM, in accordance with some embodiments. With the same resolution and SNR, the figure shows an OFDM system with a 64-QAM signal. After the same number of simulation runs as in FIG. 6, there does not appear to be a convergence of estimation error. This is at least partially because at higher QAM levels, the deviation of cross-correlation/orthogonality of I and Q from zero is much smaller, resulting in a need to collect more data to reach the same level of estimation error.

Applications

The proposed frequency synchronization method can be applied to any single carrier or multicarrier communication system where the receiver signal is complex, such as, widely used wireline and wireless systems like ADSL, WLAN, WiMax, LTE, DVB-T, etc.

The disclosed method can be used in OFDM based backhaul systems, where the base station and user equipment can both use this technology to synchronize both frequency and timing first, prior to starting high speed data transmission. This will reduce interference among users and increase spectrum reuse efficiency.

The disclosed method can be applied to LTE systems. Even when synchronized both in frequency and timing between a user and a base station, all users transmit at different timing based on their distance from the base station, to ensure that all signals arrive at the base station at the same time. The disclosed method makes multi-user detection at base station (up-link) more feasible with less complexity of receiver design. It not only reduces the interference among users, but also keeps the orthogonality between subcarrier signals for each user.

The disclosed method can be applied to any communication system where frequency synchronization is needed to boost the data throughput, increase spectrum efficiency and reduce the complexity of receivers for CFO and CFO estimation and correction, such as IEEE 802.11g, 802.11n, and 802.11ac systems.

The disclosed two stage method can be applied to frequency synchronization using the methods proposed here for initial frequency synchronization and timing acquisition, and fine-tuning frequency and timing information during connection establishment and continued communication.

The disclosed two stage method can be applied to frequency synchronization using other methods for coarse frequency and timing acquisition, and using the disclosed methods for fine-tuning frequency and timing information during connection establishment and continued communication.

The disclosed frequency and phase synchronization process can use a single bin, a subset of bins, or all available bins in a OFDM system.

In the frequency synchronization update stage, a prior signal can be used in conjunction with a current available signal based on either a sliding window or weighted average method.

Figure 8:
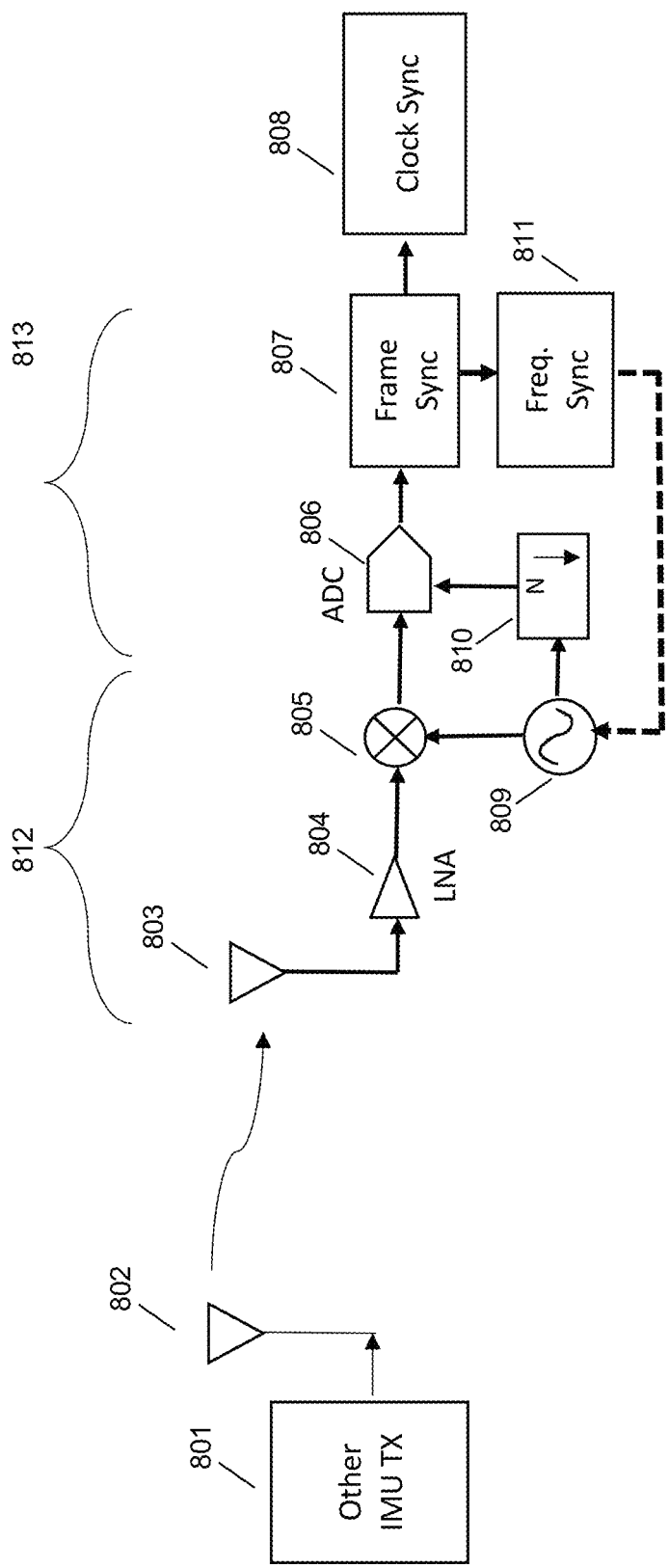
FIG. 8 is a schematic system diagram showing a first scenario for using a proposed synthetic IMU, in accordance with some embodiments.

FIG. 8 is a schematic system diagram showing a first scenario for using a proposed synthetic IMU, in accordance with some embodiments. OFDM transmitter 801 is connected to transmit antenna 802, and sends OFDM-multiplexed signals to receive antenna 803. Receive antenna 803 is connected to low noise amplifier (LNA) 804, which amplifies the low power signal received from antenna 803, and sends it to mixer 805. Mixer 805 performs downconversion from the carrier frequency to baseband. In doing so, mixer 805 utilizes the frequency generated by oscillator 809, which has frequency offset that is desired to be compensated. Mixer 805 outputs an analog baseband signal to analog to digital converter (ADC) 806; stages 803, 804, and 805 constitute the analog baseband, labeled here as section 12.

Continuing on in digital baseband section 813, ADC 806 receives its own clock signal from fractional n frequency synthesizer 810. Synthesizer 810 accepts a clock input from oscillator 809 (which is subject to frequency offset) and converts that clock input to a sample rate appropriate for the ADC, which then uses the sample rate to sample the analog input signal and transform it into a digital signal, i.e., a set of samples. ADC 806 then passes the digital signal to frame sync module 807. Frame sync module 807 determines the boundaries of each frame, as described elsewhere herein, by comparing symbols and identifying frame edges based on repeated symbols. The number of symbols to be buffered for frame synchronization is often described by the relevant OFDM standard. Once frame alignment is achieved, complete frames are sent to a OFDM demodulator to be turned from symbols into digital data. Clock sync 808 is shown as performing clock sync at the particular node.

Frequency synchronization module 811 is a module performing synchronization steps as described herein for creating synchronization. It accepts digital samples from frame sync module 807 and determines, based on cross-correlating I and Q across samples and subcarriers as described herein, whether any phase offset or frequency offset is present, and this offset signal can be fed back to oscillator 809, in some embodiments, to correct for offset.

In operation, at the initial communication stage, such as a scan, association or handshaking process, all users are synchronized with the AP/Base-station by tuning their local oscillators to match frequency and timing from the AP or base station, as shown by the dashed line between synchronization module 811 and oscillator 809 in FIG. 8. The system will maintain synchronization status by continuing to update frequency and time whenever it is needed. In this case, our CFO and SFO estimation and correction method can be used to fine-tune the oscillator continuously at the receiver.

Figure 9:
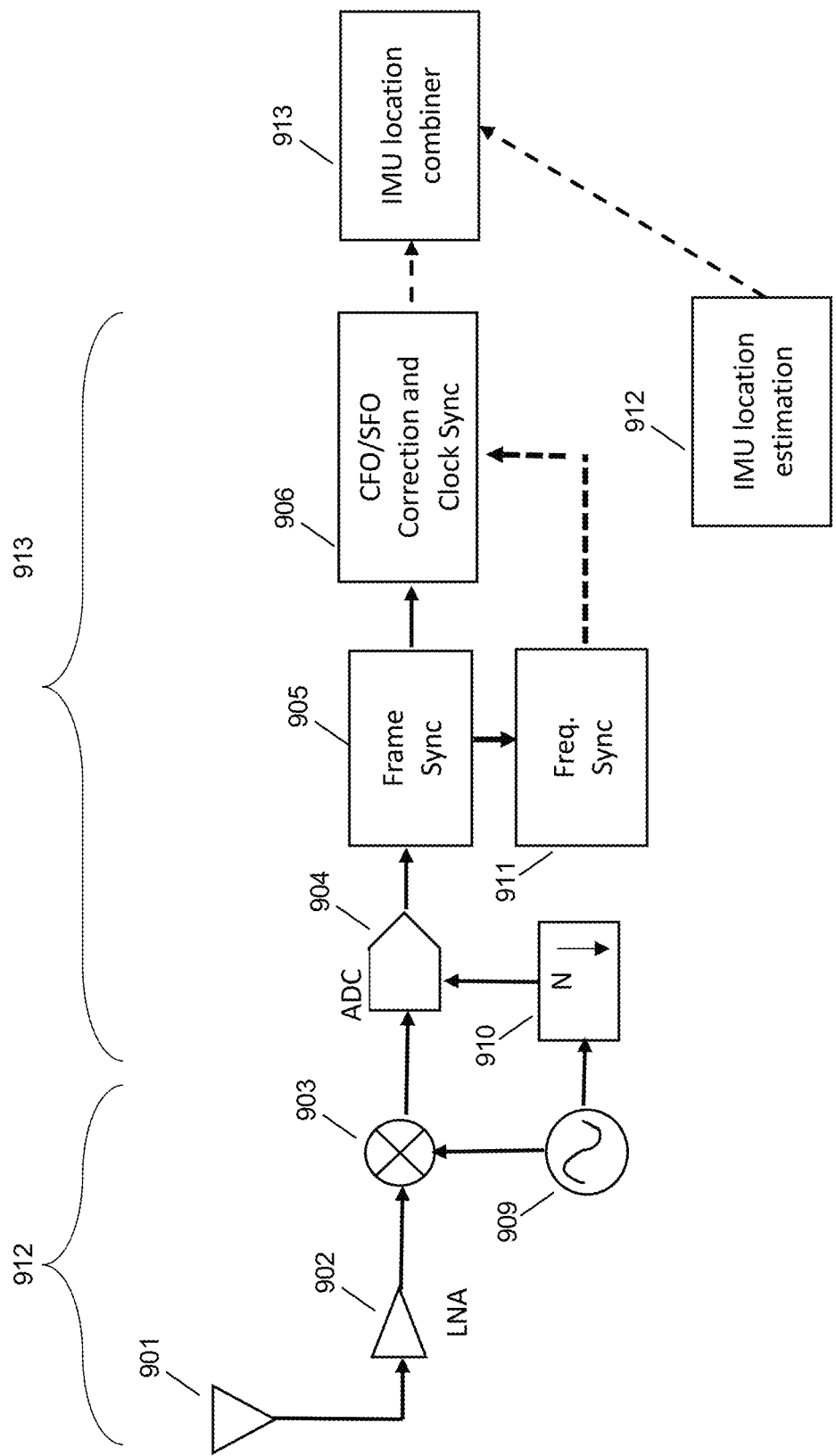
FIG. 9 is a schematic system diagram showing a second scenario for using a proposed synthetic IMU, in accordance with some embodiments.

FIG. 9 is a schematic system diagram showing a second scenario for using a proposed synthetic IMU, in accordance with some embodiments. In this second scenario, it is assumed that adjusting the local oscillator is not feasible, and that the CFO and SFO correction should be done in the digital domain. Fine frequency offset tuning could instead be applied during a data communication period as part of a frame synchronization and channel equalization procedure. Analog baseband receive chain 912 consists of antenna 901, low noise amplifier 902, and mixer 903, which operate as described in relation to FIG. 8. Mixer 903 receives a carrier frequency from oscillator 909 and subtracts it from the received signal to downconvert the signal to baseband. Oscillator 909 has a frequency offset, but is not able to receive a compensation signal. In this case, coarse synchronization can be performed between the transmitter and receiver in the initial communication stage using the method proposed herein or using a conventional method. An analog baseband signal is sent to ADC 904.

Digital baseband 913 consists of ADC 904, which receives the analog signal and converts it to a digital signal; fractional N frequency synthesizer 910, which converts oscillator 909's signal to a sampling rate for ADC 904; frame synchronization module 905, for identifying OFDM frame edges; CFO/SFO correction module 906, to be described below; and OFDM demodulator 908, which outputs bits to the main processor of the digital device (not shown).

Frequency synchronization module 911 receives digital symbols from frame sync module 905 and identifies frequency offset through the cross-correlation method described herein. However, since the oscillator does not receive the offset correction signal, it is sent to a new module, CFO/SFO correction module 906, which applies correction to the signal in the digital domain before it is sent to the OFDM demodulator 908.

A separate IMU 912 is present on the node. IMU location combiner assumes a synced clock 906 and receives IMU data from IMU 912 to estimate location. This may be done on the node or at a separate location/node/gateway.

FIG. 10A is a schematic diagram showing a wireless IMU network, in accordance with some embodiments. Multiple nodes 1011-1019 are shown in wireless communication and in full sync, acting as a synthetic IMU.

FIG. 10B is a schematic diagram showing a wireless IMU network with a rigid body or with one gyroscope at center, in accordance with some embodiments. 1029 is a large gyro that is integrated into the synthetic IMU.

From the foregoing, it will be clear that the present invention has been shown and described with reference to certain embodiments that merely exemplify the broader invention revealed herein. Certainly, those skilled in the art can conceive of alternative embodiments. For instance, those with the major features of the invention in mind could craft embodiments that incorporate one or major features while not incorporating all aspects of the foregoing exemplary embodiments.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A synthetic inertial measurement unit (IMU), comprising:
   a plurality of nodes wirelessly coupled to each other, each further comprising:
   a wireless transceiver at a particular node for providing wireless communications with at least one other node of the plurality of nodes, configured to receive I and Q radio samples from the other node, and to determine a frequency offset of the other node based on the received I and Q radio samples, and to synchronize a clock at the particular node,
   a frequency offset synchronization module at the particular node coupled to the wireless transceiver, at the particular node, and
   an IMU sensor for determining rotation, acceleration, and speed of the particular node; and
   an IMU location estimation module for using time of arrival information assuming that the clock is synchronized at the node, the determined distance, and the rotation, acceleration, and speed of the particular node received from the IMU sensor to determine the location of the nodes,
   thereby providing enhanced determination of location of the plurality of nodes.

2. The synthetic IMU of claim 1, wherein the IMU location estimation module is for receiving IMU sensor data from the other node and using the received IMU sensor data, the determined distance to the other node, and the location of the particular node to determine an inertial measurement of the other node.

3. The synthetic IMU of claim 1, wherein the synthetic IMU is configured to determine an inertial measurement of each of the plurality of nodes and determine a synthetic inertial measurement for a single rigid body coupled to the plurality of the plurality of nodes.

4. The synthetic IMU of claim 1, wherein each of the plurality of nodes is located on one of a plurality of aerial vehicles, and further comprising tracking a location of each of the plurality of aerial vehicles using the determined location of the particular node and a determined location of each of the plurality of nodes.

5. The synthetic IMU of claim 1, wherein the frequency offset synchronization module is configured to determine the frequency offset based on one or more of: an angle of arrival of the received I and Q radio samples; and a cross-correlation between the received I and Q radio samples.

6. The synthetic IMU of claim 1, wherein the plurality of nodes are physically coupled to a plurality of: autonomous vehicles; drones; mobile vehicles; space vehicles, including satellites and landers; aircraft, including airborne drones and unmanned aerial vehicles (UAVs); mobile drone, including consumer robots and appliances; or autonomous balancing vehicles.

7. The synthetic IMU of claim 1, wherein the IMU sensor is configured to provide six-axis, nine-axis, acceleration, roll, yaw, pitch, or other orientation information.

8. The synthetic IMU of claim 1, wherein the IMU sensor uses at least one of a gyroscope, an accelerometer, and a magnetometer.

9. The synthetic IMU of claim 1, wherein the synthetic IMU is coupled to a Global Positioning System (GPS) positioning system for providing enhanced positioning accuracy.

10. The synthetic IMU of claim 1, wherein the synthetic IMU is configured to provide enhanced indoor positioning accuracy for one or more of the plurality of nodes.

11. The synthetic IMU of claim 1, wherein the IMU location estimation module uses a stacked filter to combine IMU information from the particular node and from the other node.

12. The synthetic IMU of claim 1, wherein the IMU location estimation module is located at a gateway.

13. The synthetic IMU of claim 1, wherein the plurality of nodes uses properties of orthogonal frequency division multiplexing (OFDM) signaling to synchronize the nodes.

14. The synthetic IMU of claim 1, wherein the plurality of nodes uses cross-correlation of orthogonal frequency division multiplexing (OFDM) signaling to synchronize the nodes.

* * * * *